(12) United States Patent
Chi et al.

(10) Patent No.: US 7,957,358 B2
(45) Date of Patent: Jun. 7, 2011

(54) APPARATUS, METHOD, AND COMPUTER READABLE MEDIUM FOR TRANSMITTING DATA VIA A PLURALITY OF NETWORK INTERFACES

(75) Inventors: Po-Wen Chi, Taipei (TW); Yu-Hsiang Lin, Taoyuan County (TW)

(73) Assignee: Institute for Information Industry, Taipei (TW)

( * ) Notice: Subject to any disclaimer, the term of this patent is extended or adjusted under 35 U.S.C. 154(b) by 934 days.

(21) Appl. No.: 11/679,049

(22) Filed: Feb. 26, 2007

(65) Prior Publication Data

US 2008/0125163 A1 May 29, 2008

(30) Foreign Application Priority Data

Nov. 24, 2006 (TW) .............................. 95143603 A

(51) Int. Cl.
*H04M 1/00* (2006.01)

(52) U.S. Cl. ...................... 370/338; 370/328; 455/550.1
(58) Field of Classification Search .................. None
See application file for complete search history.

(56) References Cited

U.S. PATENT DOCUMENTS

| 6,658,018 | B1 | 12/2003 | Tran et al. |
| 2004/0185777 | A1* | 9/2004 | Bryson ..................... 455/41.1 |
| 2005/0108610 | A1* | 5/2005 | Kim et al. ..................... 714/748 |
| 2007/0286126 | A1* | 12/2007 | Prakash et al. ............... 370/331 |

* cited by examiner

*Primary Examiner* — Phuoc Doan
(74) *Attorney, Agent, or Firm* — Patterson Thuente Christensen Pedersen, P.A.

(57) ABSTRACT

An apparatus, a method, a computer program, and a computer readable medium for transmitting data via a plurality of network interfaces are provided. The apparatus derives statuses of transmission media and then transmits data based on the statuses. In addition, each base station adopts tunneling technique by adding a tunnel header to each of the transmitted packets. By the aforementioned arrangement, a mobile device is capable of adjusting the data amount for each of the network interfaces. Thus, the throughput of mobile host can be increased and connection can be dependable.

33 Claims, 4 Drawing Sheets

APPARATUS, METHOD, AND COMPUTER READABLE MEDIUM FOR TRANSMITTING DATA VIA A PLURALITY OF NETWORK INTERFACES

This application claims priority to Taiwan Patent Application No. 095143603 filed on Nov. 24, 2006. The disclosures of which are incorporated herein by reference in its entirety.

CROSS-REFERENCES TO RELATED APPLICATIONS

Not applicable.

BACKGROUND OF THE INVENTION

1. Field of the Invention

The present invention relates to an apparatus, a method, and a computer readable medium thereof for transmitting data via a plurality of network interfaces; specifically, it relates to an apparatus, a method, and a computer readable medium thereof for transmitting data via a plurality of network interfaces by considering the transmission tunnel quality of the network interfaces.

2. Descriptions of the Related Art

In recent years, wire and wireless access and transmission techniques are developed quickly. Many areas provide different network access ways simultaneously so that users can go on to the Internet with their own kinds of network equipments. In order to cater to the trend, most of the computer devices in the current market are equipped with more than one network access interfaces. Therefore, users can select the most suitable network access interface to connect to the Internet.

FIG. 1 shows a wireless network system 1 of the prior art comprising a laptop 11, a WiMax base station 12, a WiFi base station 13, a 3G base station 14, an access network 15, a gateway 16, a content service network (CSN) 17 and a server 18. The laptop 11 comprises a WiMax interface (not shown), a WiFi interface (not shown) and a 3G interface (not shown). When a user wants to request data from the server 18 via the laptop 11, the WiMax interface, the WiFi interface or the 3G interface can be used to connect with the access network 15 via the corresponding base station first, and then to connect with the server 18 via the gateway 16 and the content service network 17. When transmitting the data the user requests, the server 18 can use the original path in a reverse direction.

Although most of the computer devices in the current market are mostly equipped with several network access interfaces, usually only one single interface of them is used during connection. Accordingly, the bandwidth of other network channels is unused, which causes waste.

In order to improve the utilization of the network channels, the network access interfaces in one computer device should be integrated to operate at the same time. The network interface techniques nowadays may be roughly classified into two types: the first type uses a multi-link point to point protocol (MLPPP), and the other type uses an approach to manage a consumed power of each network interface. Both types will be described in detail now.

The MLPPP technique can divide data to perform a multi-path transmission via a plurality of network interfaces. An aggregation server is used in a receiving end to reassemble the received packets, and then to transmit to a service layer for further processing. The MLPPP technique can achieve simultaneous transmission by using a plurality of different network interfaces to achieve an objective of enhancing a network throughput. However, this technique can only be applied to a PPP network and so far no documents mention about how to assign data packets to each network interface effectively.

The approach for managing the consumed power is to manage the consumed power of each network interface to precisely control a power supply. A specific way is to set a threshold value to determine the level of power consumption of each network interface. Once the consumed power exceeds the threshold value (for example, a transmission distance is far), the system will shut down the network interface and switch to another one instead until the power consumption is lower than the threshold value. However, this approach only adopts a Boolean operation for control, i.e., only on or off, without a more flexible management.

According to the aforementioned descriptions, although there are techniques to integrate different network interfaces nowadays, these techniques are either limited to certain networks or not able to integrate in a more flexible manner. Consequently, how to integrate different network interfaces in a more effective way is still a serious problem in the industry.

SUMMARY OF THE INVENTION

To solve the aforementioned problem, this invention provides a mobile device for transmitting a datum to the Internet through a gateway. The mobile device comprises a generation module, a plurality of network interfaces, a detection module, a calculation module and an assignment module. The generation module is used to generate a plurality of data packets according to the datum, each of the data packets carrying the same IP address. The plurality of network interfaces are used to transmit the data packets to the gateway. The detection module is used to detect a transmission parameter of each of the network interfaces, wherein the transmission parameter indicates a transmission status of the corresponding network interface. The calculation module is used to calculate a transmission capacity of the corresponding network interface according to the transmission parameter. The assignment module is used to assign the data packets to the network interfaces according to the transmission capacities.

Another objective of this invention is to provide a base station for relaying a data packet from a mobile device to the Internet through a gateway. The base station comprises a first network interface, a package module and a second network interface, wherein the mobile device comprises a plurality of network interfaces and each of the network interfaces has a corresponding transmission capacity. The first network interface is used to receive the data packet. The first network interface corresponds to one of the network interfaces. The mobile device transmits the data packet to the first network interface according to the transmission capacities of the network interfaces. The package module is used to add a tunnel header to the data packet to derive a tunnel data packet, wherein the tunnel header indicates the data packet being from the base station. The second network interface is used to transmit the tunnel data packet to the gateway.

Yet another objective of the invention is to provide a gateway for transmitting a datum to a mobile device on the Internet through a plurality of base stations. The gateway comprises a generation module, a first network interface, a second network interface, a request module, a calculation module, an assignment module and a package module. The first network interface is used to receive the datum from the Internet. The generation module is used to generate a plurality of data packets according to the datum, wherein each of the data packets carries the same IP address. The request module is used to request a transmission parameter of each of a plurality of network interfaces, wherein the mobile device comprises the plurality of network interfaces. Each of the network interfaces corresponds to one of the base stations. Each of the transmission parameters indicates a transmission status of the corresponding network interface. The calculation module is used to calculate a transmission capacity of the corresponding network interface according to the transmission parameter. The assignment module is used to assign the data packets to the network interfaces according to the transmission capacities. The package module is used to add a tunnel header to each of the data packets to derive a tunnel data packet according to the assignment, wherein the tunnel header indicates the assigned network interface. The second network interface is used to transmit each of the tunnel data packets to the corresponding base station according to the tunnel header.

A further objective of the invention is to provide a base station for relaying a tunnel data packet from a gateway to a mobile device. The base station comprises a first network interface, a removal module and a second network interface. The first network interface is used to receive the tunnel data packet, wherein the gateway transmits the tunnel data packet to the first network interface according to a transmission capacity of the first network interface. The removal module is used to remove a tunnel header of the tunnel data packet to derive a data packet. The second network interface is used to transmit the data packet to the mobile device.

Yet a further objective of the invention is to provide a method for making a mobile device transmit a datum to the Internet through a gateway. The mobile device comprises a plurality of network interfaces. The method comprises the steps of: generating a plurality of data packets according to the datum, wherein each of the data packets carries the same IP address; detecting a transmission parameter of each of the plurality of network interfaces, wherein the transmission parameter indicates a transmission status of the corresponding network interface; calculating a transmission capacity of the corresponding network interface according to the transmission parameter; assigning the data packets to the network interfaces according to the transmission capacities; and transmitting the data packets to the gateway through the network interfaces.

Yet a further objective of the invention is to provide a method for relaying a data packet from a mobile device to the Internet through a gateway. The mobile device comprises a plurality of network interfaces and each of the network interfaces has a corresponding transmission capacity. The method comprises the steps of: receiving the data packet from a first network interface, wherein the first network interface corresponds to one of the network interfaces, and the mobile device transmits the data packet to the first network interface according to the transmission capacities of the network interfaces; adding a tunnel header to the data packet to derive a tunnel data packet, wherein the tunnel header indicates the data packet being from the base station; and transmitting the tunnel data packet to the gateway.

Yet a further objective of the invention is to provide a method for making a gateway transmit a datum to a mobile device on the Internet through a plurality of base stations. The method comprises the steps of: receiving the datum from the Internet; generating a plurality of data packets according to the datum, wherein each of the data packets carries the same IP address; requesting a transmission parameter of each of a plurality of network interfaces of the mobile device, wherein each of the network interfaces corresponds to one of the base stations, and each of the transmission parameters indicates a transmission status of the corresponding network interface; calculating a transmission capacity of the corresponding network interface according to the transmission parameter; assigning the data packets to the network interfaces according to the transmission capacities; adding a tunnel header to each of the data packets to derive a tunnel data packet according to the assignment, wherein the tunnel header indicates the assigned network interface; and transmitting each of the tunnel data packets to the corresponding base station according to the tunnel header.

Yet a further objective of the invention is to provide a method for relaying a tunnel data packet from a gateway to a mobile device. The method comprises the steps of: receiving the tunnel data packet, wherein the gateway transmits the tunnel data packet to a network interface according to a transmission capacity of the network interface; removing a tunnel header of the tunnel data packet to derive a data packet; and transmitting the data packet to the mobile device.

Yet a further objective of the invention is to provide a computer readable medium for storing a computer program which has code for executing any of the aforementioned methods.

The invention first obtains the corresponding transmission channel status of each network interface for assigning data packets to be transmitted. Then, the invention uses a tunneling technique in the base station and the gateway; that is, each base station adds a tunnel header in transmitted data packets so that the gateway can recognize them to prevent problems caused by routings. Since the invention executes the tunneling technique at each base station instead of the mobile device, the data packet comprises a tunnel header only when it is transmitted between the base station and the gateway. When the data packet is transmitted between the mobile device and the base station, the tunnel header no longer exists. Consequently, a bandwidth between the mobile device and the base station can be saved.

With the aforementioned configuration, the invention can use a plurality of network interfaces simultaneously to perform data transmission to enhance the network throughput without adding any network protocol mechanism such as the MLPPP. The mobile device can dynamically adjust a transmission amount for each network interface. Not only can a required memory space for data reassembling be reduced, but also power can be used effectively. Furthermore, the gateway can also perform an effective management for its own nodes.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

An objective of the invention is to integrate a plurality of network interfaces in a mobile device so that the mobile device can use the network interfaces simultaneously for transmission to enhance a utilization rate of network channels.

Figure 1:
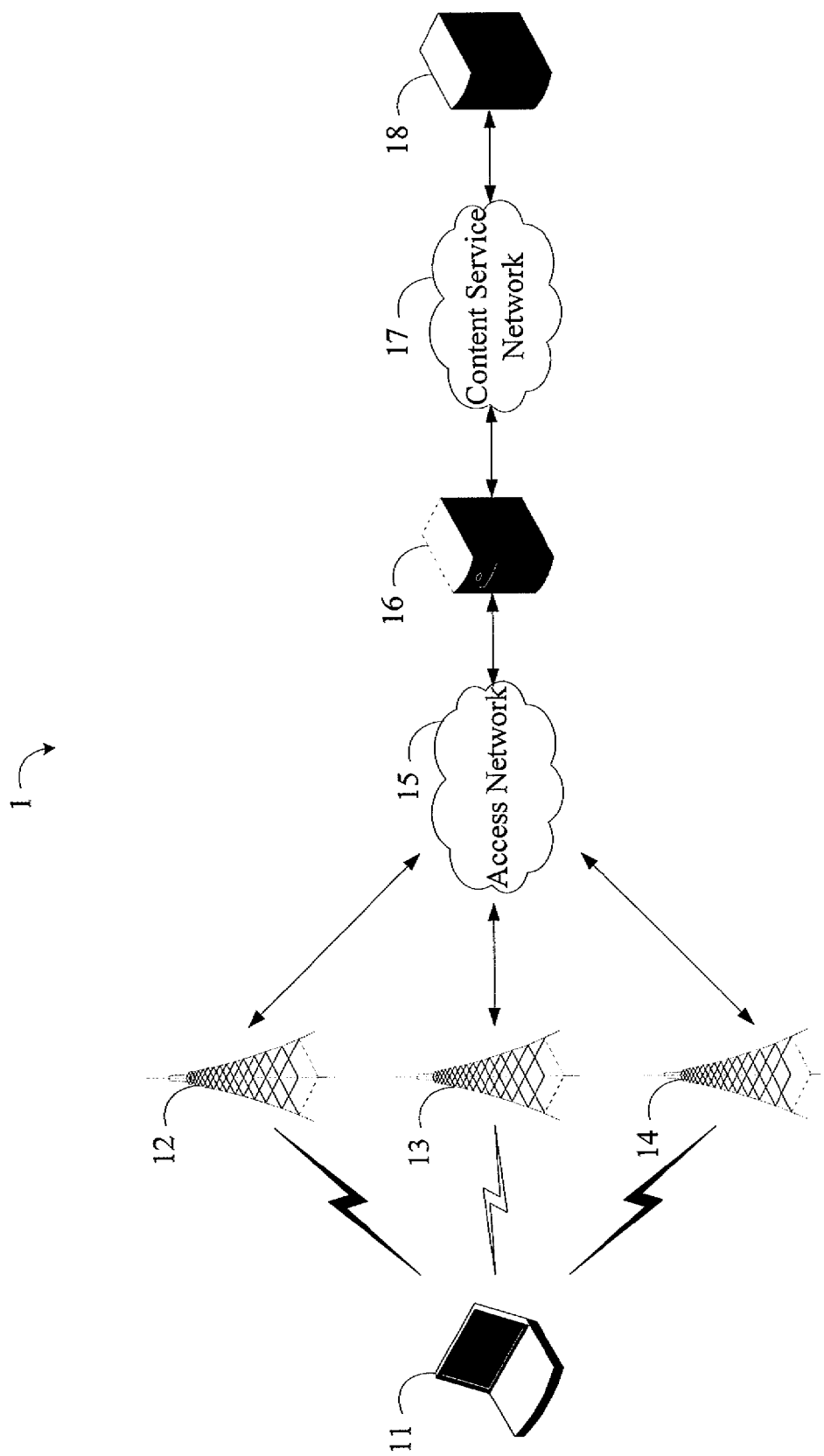
FIG. 1 is a schematic diagram of a wireless network system of the prior art.
Figure 2:
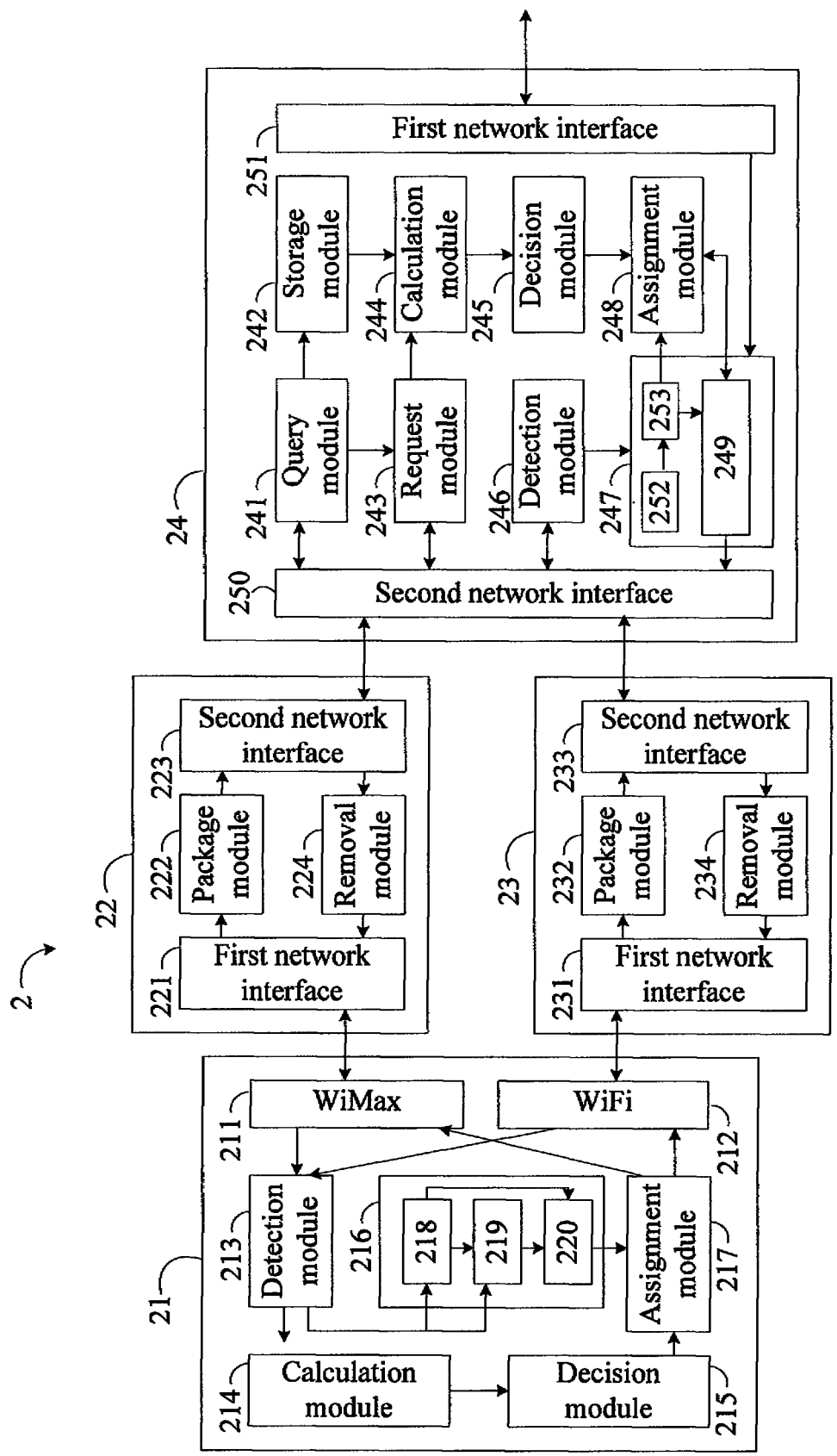
FIG. 2 is a schematic diagram of a first embodiment of the invention.

FIG. 2 shows a first embodiment of the invention which is a wireless network system 2 comprising a laptop 21, i.e., the mobile device, a WiMax base station 22, a WiFi base station 23 and a gateway 24.

As shown in FIG. 2, the laptop 21 comprises two network interfaces, a WiMax interface 211 and a WiFi interface 212. Furthermore, the laptop 21 comprises a detection module 213, a calculation module 214, a decision module 215, a generation module 216 and an assignment module 217. The generation module 216 comprises a determination module 218, a division module 219 and a package module 220. The WiMax base station 22 comprises a first network interface 221, a package module 222, a second network interface 223 and a removal module 224. The WiFi base station 23 comprises a first network interface 231, a package module 232, a second network interface 233 and a removal module 234. The gateway 24 comprises a query module 241, a storage module 242, a request module 243, a calculation module 244, a decision module 245, a detection module 246, a generation module 247, an assignment module 248, a first network interface 251 and a second network interface 250. The generation module 247 comprises a package module 249, a determination module 252 and a division module 253.

The following will describe the operations of the wireless network system 2 with two transmission directions. The first direction is that the laptop 21 transmits a datum to the Internet through the gateway 24, and the other direction is that the Internet transmits a datum to the laptop 21 through the gateway 24. Both directions rely on the WiMax base station 22 and the WiFi base station 23 in between.

First, the operations that the laptop 21 transmits the datum via the WiMax base station 22 and the WiFi base station 23 to the gateway 24 and then to the Internet are described. The laptop 21 performs a series of operations to decide how to transmit the datum via the WiMax interface 211 and the WiFi interface 212, respectively, to the WiMax base station 22 and the WiFi base station 23 to effectively utilize the bandwidth.

More particularly, while transmitting the datum, the detection module 213 detects a transmission parameter of the transmission channel corresponding to the WiMax interface 211, i.e., the channel between the WiMax interface 211 and the WiMax base station 22 and a transmission parameter of the transmission channel corresponding to the WiFi interface 212, i.e., the channel between the WiFi interface 212 and the WiFi base station 23. Each transmission parameter represents one or a combination of a required transmission distance, an available bandwidth, a SNR of the corresponding transmission channel. These factors in the transmission parameter affect a quality of the transmission channel. The wider the bandwidth is, the shorter the required transmission time is. The larger the SNR is, the clearer the signal is. In addition, the detection module 213 also detects a maximum transmission unit (MTU) acceptable in each network interface. In this embodiment, the maximum transmission unit of the WiMAX interface 211 is denoted as a $MTU_1$, and the maximum transmission unit of the WiFi interface 212 is denoted as a $MTU_2$. After the $MTU_1$ and the $MTU_2$ is detected, the smaller one is set as a minimum transmission unit of the laptop 21.

The calculation module 214 calculates a transmission capacity of each network interface according to the transmission parameter with, for example, a Shannon capacity formula $C=B \log_2(1+SNR)$, wherein C denotes the transmission capacity, B denotes an available bandwidth of the corresponding network interface, and SNR denotes the signal-to-noise ratio of the transmission channel of the corresponding network interface. After the calculation performed by the calculation module 214, a transmission capacity $C_1$ of the WiMax interface 211 and a transmission capacity $C_2$ of the WiFi interface 212 can be obtained. In this embodiment, assume that a ratio of the transmission capacity $C_1$ and the transmission capacity $C_2$ is 7:3.

Then, the decision module 215 decides an assignment ratio for the WiMax interface 211 and the WiFi interface 212 in response to the transmission capacities $C_1$ and $C_2$. In this embodiment, the decision module 215 makes that the transmission capacity and the assignment ratio are in direct proportion. In other words, since the ratio of the transmission capacity $C_1$ and the transmission capacity $C_2$ is 7:3, the decision module 215 decides the assignment ratio to be 7:3.

The generation module 216 generates at least one data packet in response to the datum for transmission, wherein each of the data packets carries the same IP address. More particularly, the determination module 218 determines whether the datum requires division, i.e., determines whether a length of the datum is larger than the minimum transmission unit. If positive, the division is required. Under such a circumstance, the division module 219 divides the datum into a plurality of sub-datum whose length is smaller than the minimum transmission unit. Finally, the package module 220 packages the sub-data into a plurality of data packets. If the determination module 218 determines that the datum does not require division, the package module 220 packages the datum into one data packet.

Then, the assignment module 217 assigns 70% of the data packets to the WiMax interface 211 and 30% of the data packets to the WiFi interface 212 according to the assignment ratio. One specific way to achieve that is that the first 70% of the data packets are assigned to the WiMax interface 211 and the rest are assigned to the WiFi interface 212. Alternatively, the data packets may be assigned in an interleaving manner. For example, 10% of the data packets in a certain period of time are assigned to the WiMax interface 211 and the WiFi interface 212 in turn until the data packets assigned to the WiFi interface 212 reach 30%, and the remaining data packets are assigned to the WiMax interface 211. Finally, the WiMax interface 211 and the WiFi interface 212 transmit the assigned data packets to the WiMax base station 22 and the WiFi base station 23, respectively.

Now the operations of the WiMax base station 22 and the WiFi base station 23 are described. That is, how the WiMax base station 22 and the WiFi base station 23 relay the data packets to the gateway 24 is described.

The first network interface 221 of the WiMax base station 22 receives the data packets from the laptop 21. Then, the package module 22 of the WiMax base station 22 adds a tunnel header to each received data packet to form a tunnel data packet. The tunnel data packet carries information of the WiMax base station 22 so that the gateway 24 can recognize that the tunnel data packet comes from the WiMax base station 22 when receiving the tunnel data packet. More particularly, the package module 222 adopts an IP in IP approach to achieve the adding operation, i.e., each data packet is added by an IP header of an IP address of the WiMax base station 22. Finally, the second network interface 223 of the WiMax base station 22 transmits the tunnel data packets to the gateway 24.

Similarly, the first network interface 231 of the WiFi base station 23 receives the data packets from the laptop 21. Then, the package module 232 adds an IP header of an IP address of the WiFi base station 23 to each received data packet. Finally, the second network interface 233 of the WiFi base station 23 transmits the tunnel data packets to the gateway 24.

It is noted that the package modules 222 and 232 can adopt a general routing encapsulation (GRE) header, a control and provisioning of wireless access points (CAPWAP) header, a point to point tunneling protocol (PPTP) header, or a SSH header to replace the IP header instead. These headers all comprise an embeddable IP address field. The IP addresses of the WiMax base station 22 and the WiFi base station 23 can be filled into the field.

After the gateway 24 receives the tunnel data packets transmitted by the WiMax base station 22 and the WiFi base station 23 through the second network interface 250, the gateway 24 can recognize that each tunnel data packet comes from which base station with reference to the added tunnel header. Next, the gateway 24 removes the tunnel headers of the tunnel data packets to derive a data packet based on the way of the prior art. After that, the gateway 24 transmits the data packets to the Internet through the first network interface 251.

Now the operations for the second transmission direction are described. This transmission direction also relies on the WiMax base station 22 and the WiFi base station 23. The gateway 24 will perform a series of operations first and then assign a datum to the WiMax base station 22 and the WiFi base station 23 to transmit to the laptop 21.

At first, the first network interface 251 of the gateway 24 receives a datum from the Internet. Before transmitting out, the gateway 24 has to know what kinds of network interfaces the laptop 21 has. Consequently, the query module 241 of the gateway 24 queries the base stations 22 and 23 via the second network interface 250 to obtain information that the laptop 21 comprises the WiMax interface 211 and the WiFi interface 212. Next, the storage module 242 stores the information, i.e., stores the information that WiMax and WiFi networks are available for the laptop 21.

The request module 243 requests a transmission parameter of a WiMax transmission channel and a transmission parameter of a WiFi transmission channel. The transmission parameters are the same as the aforementioned ones and thus no unnecessary details are given here. However, the gateway 24 is not able to directly detect the transmission parameters like the laptop 21. This is because the gateway 24 has to rely on the WiMax base station 22/the WiFi base station 23 to establish connection with the WiMax interface 211/the WiFi interface 212. Consequently, the request module 243 uses a "get" instruction of the simple network management protocol (SNMP) to obtain the transmission parameters of the WiMax interface 211 and of the WiFi interface 212. It is noted that the request module 241 can also use a transmission protocol of the CAPWAP or other similar functions to achieve the request.

The calculation module 244 calculates a transmission capacity of the corresponding network interface according to each transmission parameter. In this embodiment, the calculation module 244 also adopts the Shannon capacity formula $C=B \log_2(1+SNR)$ to derive the transmission capacity. In this embodiment, assume that a transmission capacity $C_1$ of the WiMax interface 211 and a transmission capacity $C_2'$ of the WiFi interface 212 are obtained, and the ratio of the transmission capacity $C_1'$ and the transmission capacity $C_2'$ is 6:4 according to the transmission parameters. It is noted that the calculation module 244 is not necessary to adopt the same calculation equation as the calculation module 214 of the laptop 21 does to derive the ratio of the transmission capacities.

The decision module 245 decides an assignment ratio for the WiMax interface 211 and the WiFi interface 212, i.e., the ratio of the datum to be transmitted to the WiMax base station 22 and the WiFi station 23 in response to the transmission capacities $C_1'$ and $C_2'$. In this embodiment, the decision module 245 makes that the ratio of the transmission capacities $C_1'$ and $C_2'$ and the assignment ratio of the network interfaces are in direct proportion. Consequently, the assignment ratio of the WiMax interface 211 and the WiFi interface 212 is 6:4.

The detection module 246 detects the $MTU_1$ for the WiMax interface 211 and the $MTU_2$ for the WiFi interface 212. The smaller one of both is set as a minimum transmission unit of the gateway 24. Then, the generation module 247 generates at least one data packet according to the datum, wherein each of the data packets carries the same IP address. More particularly, the determination module 252 determines whether the datum needs division, i.e., determines whether a length of the datum is larger than the minimum transmission unit. If positive, the division is required. Under such a circumstance, the division module 253 divides the datum into a plurality of sub-data. Finally, the package module 249 packages each sub-datum into a plurality of data packets. If the determination module 252 determines that the length of the datum is smaller than the minimum transmission unit, the package module 249 packages the datum into one data packet. Therefore, the size of each data packet is not greater than the minimum transmission unit.

The aforementioned modules communicate with the laptop 21, the WiMax base station 22 and/or the WiFi base station 23 through the second network interface 250 if necessary.

The assignment module 248 assigns the data packets to the WiMax network and the WiFi network according to the transmission capacities $C_1'$ and $C_2'$. More particularly, 60% of the data packets are assigned to the WiMax network and 40% of the data packets are assigned to the WiFi network. The specific approach is similar to the assignment manner adopted by the assignment module 217 of the laptop 21 and thus no unnecessary detail is given here. The package module 249 then adds a tunnel header to each data packet to form a tunnel data packet, wherein the tunnel header indicates the assigned network interface. The tunnel header can be one of the IP header, the GRE header, the CAPWAP header, the PPTP header and the SSH header. Finally, the second network interface 250 transmits the tunnel data packets to the corresponding network interface, the WiMax interface 211 or the WiFi interface 212, through the appropriate base station according to the tunnel header of each tunnel data packet.

The base stations will receive these tunnel data packets and transmit to the laptop 21. More particularly, the second network interface 223 of the WiMax base station 22 receives the WiMax tunnel data packets and the removal module 224 then removes the tunnel headers from the tunnel data packets to obtain data packets. The data packets are transmitted to the WiAax interface 211 of the laptop 21 through the first network interface 221. Similarly, the second network interface 233 of the WiFi base station 23 receives the WiFi tunnel data packets and the removal module 234 removes the tunnel headers from the tunnel data packets to obtain data packets. The data packets are transmitted to the WiFi interface 212 of the laptop 21 through the first network interface 231.

After the laptop 21 receives the data packet from the WiMax interface 211 and the WiFi interface 212, the techniques of the prior art can be used to reassemble the data packets to recover the datum.

With the aforementioned configuration, the embodiment can utilize the plurality of network interfaces to perform data transmission simultaneously to enhance a network throughput. Furthermore, adding a tunnel header solves the routing problem.

It is noted that it is not necessary to rely on the same base stations to transmit data from the laptop 21 to the gateway 24 and to transmit data from the gateway 24 to the laptop 21. In other words, although the WiMax base station 22 and the WiFi base station 23 have bidirectional data transmission capability in this embodiment, each of them can be replaced by two base stations with a single direction transmission capability. The laptop 21 can also be replaced by any apparatus with a network transmission capability. Furthermore, the invention does not limit any number or kind of the network interface.

Figure 3A:
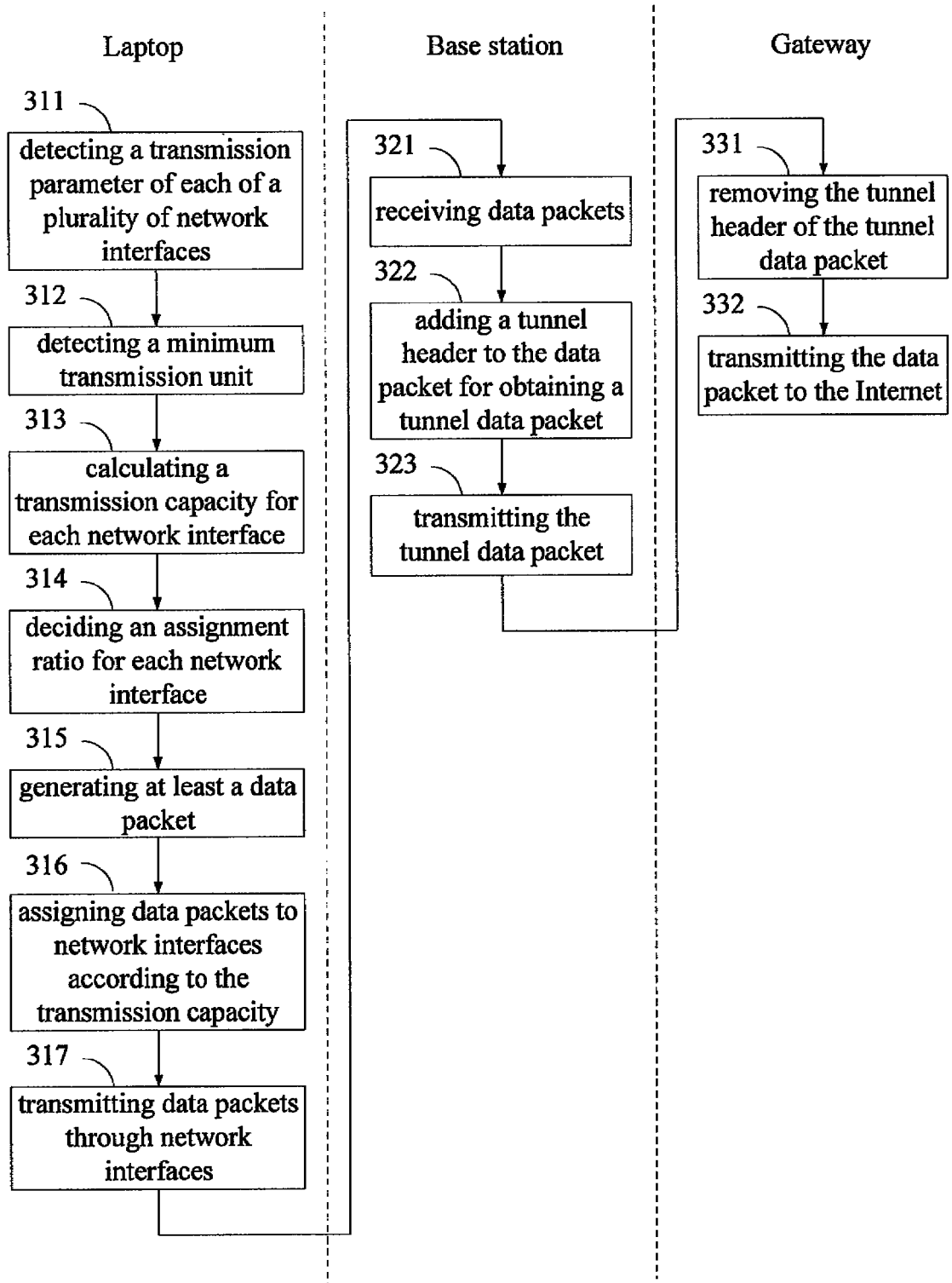
FIG. 3A is a flow chart of a second embodiment of the invention.
Figure 3B:
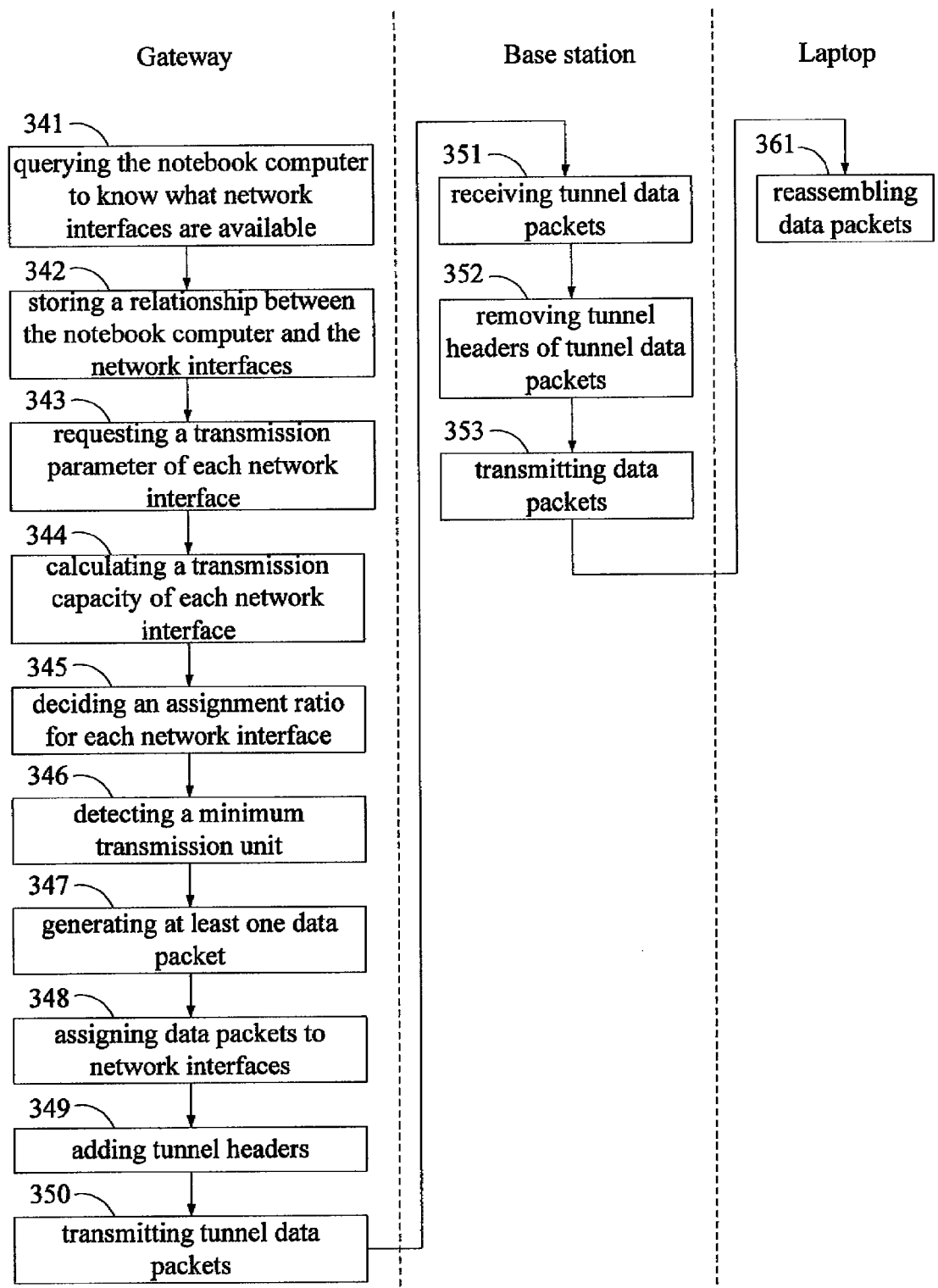
FIG. 3B is another flow chart of the second embodiment.

FIG. 3A and FIG. 3B show a second embodiment of the invention which is a transmission method or a wireless network system. The system can be the wireless network system 2 of the first embodiment.

The second embodiment also describes the transmission method of the wireless network system with two transmission directions. The first direction is that a laptop transmits a datum to the Internet through a gateway, and the other direction is that the Internet transmits a datum to the laptop through the gateway. Both directions rely on a WiMax base station and a WiFi base station in between to relay the datum.

First, as shown in FIG. 3A, step 311 is executed to enable the detection module 213 to detect a transmission parameter of the transmission channel corresponding to WiMax interface 211 and a transmission parameter of the transmission channel corresponding to WiFi interface 212 of the laptop. The transmission parameters are the same as the first embodiment and no unnecessary detail is given here. Next, step 312 is executed for enabling the detection module 213 to detect a maximum transmission unit defined by each network interface and the smallest one is set as a minimum transmission unit.

Next, step 313 is executed to enable the calculation module 214 to calculate a transmission capacity of each network interface according to the transmission parameter. The calculation is the same as the first embodiment and no unnecessary details are given here. Next, step 314 is executed to enable the decision module 215 to decide an assignment ratio of each of the network interfaces in response to the transmission capacities. Similarly, the decision module 215 decides that the transmission parameter and the assignment ratio of each of the network interfaces are in direct proportion.

Next, step 315 is executed to enable the generation module 216 to generate at least one data packet in response to the datum for transmission, wherein each of the data packets carries the same IP address. More particularly, enable the determination module 218 to determine whether the datum is required for division, i.e., determine whether a length of the datum is larger than the minimum transmission unit. If positive, the division is required. Under such a circumstance, the method makes the division module 219 divide the datum into a plurality of sub-datum whose length is smaller than the minimum transmission unit. Finally, enable the package module 220 to package the sub-data into a plurality of data packets. If the datum is not required for division, enable the package module 220 to package the datum into one data packet. Under such a circumstance, the size of each data packet is smaller than the minimum transmission unit.

After dividing into the data packets, step 316 is executed to enable the assignment module 217 to assign the data packets to the WiMax interface 211 and the WiFi interface 212 according to the assignment ratio. Finally, step 317 is executed for transmitting the assigned data packets to the WiMax base station 22 and the WiFi base station 23, respectively.

Next, the WiMax base station 22/the WiFi base station 23 execute step 321 to individually receive the data packets from the first network interfaces 221 and 231. In step 322, enable the package modules 222 and 232 to add a tunnel header to the data packets to derive a tunnel data packet. This portion is the same as described in the first embodiment and thus no unnecessary details are given. Finally, step 323 is executed to enable the second network interfaces 223 and 233 to transmit the tunnel data packets to the gateway 24, respectively.

After the gateway 24 receives the tunnel data packets transmitted by the WiMax base station 22 and the WiFi base station 23 through the second network interface 250, step 331 is executed to enable the gateway 24 to remove the tunnel headers of the tunnel data packets to derive a data packet based on the way of the prior art. After that, step 322 is executed for making the first network interface 251 transmit the data packets to the Internet.

The following describes the second transmission direction of the embodiment. That is, the datum is transmitted from the gateway 24 to the laptop 21.

At first, as shown in FIG. 3B, step 341 is executed to enable the query module 241 of the gateway 24 to query base stations 22 and 23 via the second network interface 250 in order to obtain the information that the laptop 21 comprises the WiMax interface 211 and the WiFi interface 212. Next, step 342 is executed to enable the storage module 242 to store a relationship among the laptop 21 and network interfaces 211 and 212. Next, step 343 is executed to enable the request module 243 to request a transmission parameter for the network interfaces. The specific way for this step is the same as the aforementioned embodiment and thus no unnecessary details are given here. Later, step 344 is executed to enable the calculation module 244 to calculate a transmission capacity of each of the network interfaces according to the transmission parameters. The specific way for this step is the same as the aforementioned embodiment and thus no unnecessary detail is given here. Next, step 345 is executed for enabling the decision module 245 to decide an assignment ratio of the network interfaces corresponding to the transmission capacities. Similarly, the transmission parameter and the assignment ratio of each network interface are in direct proportion.

Next, step 346 is executed to enable the detection module 246 to detect the maximum transmission unit defined by each of the network interfaces and select the smallest one as a minimum transmission unit. Next, step 347 is executed to enable the generation module 247 to generate at least one data packet, each of the at least one data packet carries the same IP address. More particularly, enable the determination module 252 to determine whether the datum needs to be divided, i.e., determine whether a length of the datum is larger than the minimum transmission unit. If positive, the division is required. Under such a circumstance, enable the division module 253 to divide the datum into a plurality of sub-data. Finally, enable the package module 249 to package each sub-datum into a plurality of data packets. If the datum does not have to be divided, then enable the package module 249 to package the datum into a data packet, wherein a size of each data packet is not greater than the minimum transmission unit.

Next, step 348 is executed to enable the assignment module 248 to assign the data packets to the network interfaces according to the transmission capacities. Next, step 349 is executed to enable the package module 249 to add a tunnel header to each data packet to derive a tunnel data packet, wherein the tunnel header indicates the assigned network interface. Final, step 350 is executed to enable the second network interface 250 to transmit the tunnel data packets to the corresponding network interface according to the tunnel header.

After executing step 350, the WiMax base station 22/the WiFi base station 23 separately execute step 351 to enable the second network interfaces 223 and 233 receive the tunnel data packets. Next, step 352 is executed to enable the removal modules 224 and 234 to remove the tunnel headers of the tunnel data packets to obtain the data packets. Finally, step 353 is executed to enable the first network interface 221 and 231 to transmit the data packets to the laptop 21. After executing step 353, step 361 is executed to enable the WiMax interface 211 and the WiFi interface 212 of the laptop 21 to receive the data packets. Finally, step 362 is executed so that the laptop 21 could reassemble the data packets by the prior technique in order to obtain the transmitted data of the gateway 24.

Besides aforementioned steps, the second embodiment can further execute operations and methods described in the first embodiment.

The aforementioned methods can be implemented by a computer program. In other words, the laptop, the base station, and the gateway can individually install an appropriate computer program which has codes to execute the aforementioned methods. The computer program can be stored in a computer readable medium. The computer readable medium can be a floppy disk, a hard disk, an optical disc, a flash disk, a tape, a database accessible from a network or a storage medium with the same functionality that can be easily thought by people skilled in the art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mobile device for transmitting a datum to the Internet through a gateway, comprising:
   a generation module for generating a plurality of data packets according to the datum, each of the data packets carrying the same IP address;
   a plurality of network interfaces for transmitting the data packets to the gateway simultaneously;
   a detection module for detecting a transmission parameter of each of the network interfaces, the transmission parameter indicating a transmission status of the corresponding network interface;
   a calculation module for calculating a transmission capacity of the corresponding network interface according to the transmission parameter; and
   an assignment module for assigning the data packets to the network interfaces according to the transmission capacities.

2. The mobile device of claim 1, wherein the calculation module calculates the transmission capacity according to the following equation:

$$C=B \log_2(1+SNR);$$

wherein C denotes the transmission capacity, B denotes an available bandwidth of the corresponding network interface, and SNR denotes the signal-to-noise ratio of a transmission channel of the corresponding network interface.

3. The mobile device of claim 1, further comprising:
   a decision module for deciding an assignment ratio for each of the network interfaces according to the transmission capacities;
   wherein the assignment module assigns the data packets according to the assignment ratios.

4. The mobile device of claim 3, wherein the transmission capacity and the assignment ratio of each of the network interfaces are in direct proportion.

5. The mobile device of claim 1, wherein each of the network interfaces corresponds to a maximum transmission unit, the detection module further defines the smallest maximum transmission unit as a minimum transmission unit, and each of the data packets is not larger than the minimum transmission unit.

6. A gateway for transmitting a datum to a mobile device on the Internet through a plurality of base stations, comprising:
   a first network interface for receiving the datum from the Internet;
   a generation module for generating a plurality of data packets according to the datum, each of the data packets carrying the same IP address;
   a request module for requesting a transmission parameter of each of a plurality of network interfaces of the mobile device, wherein each of the network interfaces corresponds to one of the base stations, and each of the transmission parameters indicates a transmission status of the corresponding network interface;
   a calculation module for calculating a transmission capacity of the corresponding network interface according to the transmission parameter;
   an assignment module for assigning the data packets to the network interfaces according to the transmission capacities;
   a package module for adding a tunnel header to each of the data packets to derive a tunnel data packet according to the assignment, wherein the tunnel header indicates the assigned network interface; and
   a second network interface for transmitting each of the tunnel data packets to the corresponding base station according to the tunnel header.

7. The gateway of claim 6, wherein the calculation module calculates the transmission capacity according to the following equation:

$$C=B \log_2(1+SNR);$$

wherein C denotes the transmission capacity, B denotes an available bandwidth of the corresponding network interface, and SNR denotes the signal-to-noise ratio of a transmission channel of the corresponding network interface.

8. The gateway of claim 6, further comprising:
   a query module for querying each of the base stations to know if the network interfaces are available to the mobile device; and
   a storage module for storing a relationship between the mobile device and the network interfaces.

9. The gateway of claim 6, further comprising:
   a decision module for deciding an assignment ratio for each of the network interfaces according to the transmission capacities;
   wherein the assignment module assigns the data packets according to the assigning ratios.

10. The gateway of claim 9, wherein the transmission capacity and the assignment ratio of each of the network interfaces are in direct proportion.

11. The gateway of claim 6, each of the network interfaces corresponds to a maximum transmission unit, the gateway further comprising:
   a detection module for defining the smallest maximum transmission unit as a minimum transmission unit and each of the data packets is not larger than the minimum transmission unit.

12. A method for making a mobile device transmit a datum to the Internet through a gateway, comprising the steps of:
   generating a plurality of data packets according to the datum, each of the data packets carrying the same IP address;
   detecting a transmission parameter of each of a plurality of network interfaces, the mobile device comprising the network interfaces, and the transmission parameter indicating a transmission status of the corresponding network interface;
   calculating a transmission capacity of the corresponding network interface according to the transmission parameter;
   assigning the data packets to the network interfaces according to the transmission capacities; and
   transmitting the data packets to the gateway through the network interfaces simultaneously.

13. The method of claim 12, wherein the calculating step calculates the transmission capacity according to the following equation:

$$C = B \log_2(1+SNR);$$

wherein C denotes the transmission capacity, B denotes an available bandwidth of the corresponding network interface, and SNR denotes the signal-to-noise ratio of a transmission channel of the corresponding network interface.

14. The method of claim 12, further comprising the step of:
   deciding an assignment ratio for each of the network interfaces according to the transmission capacities;
   wherein the assigning step assigns the data packets according to the assignment ratios.

15. The method of claim 14, wherein the transmission capacity and the assignment ratio of each of the network interfaces are in direct proportion.

16. The method of claim 12, wherein each of the network interfaces corresponds to a maximum transmission unit, the detecting step further defines the smallest maximum transmission unit as a minimum transmission unit, and each of the data packets is not larger than the minimum transmission unit.

17. A method for making a gateway transmit a datum to a mobile device on the Internet through a plurality of base stations, comprising the steps of:
   receiving the datum from the Internet;
   generating a plurality of data packets according to the datum, each of the data packets carrying the same IP address;
   requesting a transmission parameter of each of a plurality of network interfaces of the mobile device, wherein each of the network interfaces corresponds to one of the base stations, and each of the transmission parameters indicates a transmission status of the corresponding network interface;
   calculating a transmission capacity of the corresponding network interface according to the transmission parameter;
   assigning the data packets to the network interfaces according to the transmission capacities;
   adding a tunnel header to each of the data packets to derive a tunnel data packet according to the assignment, wherein the tunnel header indicates the assigned network interface; and
   transmitting each of the tunnel data packets to the corresponding base station according to the tunnel header.

18. The method of claim 17, wherein the calculating step calculates the transmission capacity according to the following equation:

$$C = B \log_2(1+SNR);$$

wherein C denotes the transmission capacity, B denotes an available bandwidth of the corresponding network interface, and SNR denotes the signal-to-noise ratio of a transmission channel of the corresponding network interface.

19. The method of claim 17, further comprising the steps of:
   querying each of the base stations to know if the network interfaces are available to the mobile device; and
   storing a relationship between the mobile device and the network interfaces.

20. The method of claim 17, further comprising the step of:
   deciding an assignment ratio for each of the network interfaces according to the transmission capacities;
   wherein the assigning step assigns the data packets according to the assigning ratios.

21. The method of claim 20, wherein the transmission capacity and the assignment ratio of each of the network interfaces are in direct proportion.

22. The method of claim 17, each of the network interfaces corresponds to a maximum transmission unit, the method further comprising the step of:
   defining the smallest maximum transmission unit as a minimum transmission unit and each of the data packets is not larger than the minimum transmission unit.

23. A computer readable medium, storing an application program for executing a method for making a mobile device transmit a datum to the Internet through a gateway, the method comprising the steps of:
   generating a plurality of data packets according to the datum, each of the data packets carrying the same IP address;
   detecting a transmission parameter of each of a plurality of network interfaces, the mobile device comprising the network interfaces, and the transmission parameter indicating a transmission status of the corresponding network interface;
   calculating a transmission capacity of the corresponding network interface according to the transmission parameter;
   assigning the data packets to the network interfaces according to the transmission capacities; and
   transmitting the data packets to the gateway through the network interfaces simultaneously.

24. The computer readable medium of claim 23, wherein the calculating step calculates the transmission capacity according to the following equation:

$$C = B \log_2(1+SNR);$$

wherein C denotes the transmission capacity, B denotes an available bandwidth of the corresponding network interface, and SNR denotes the signal-to-noise ratio of a transmission channel of the corresponding network interface.

25. The computer readable medium of claim 23, the method further comprising the step of:

deciding an assignment ratio for each of the network interfaces according to the transmission capacities;
wherein the assigning step assigns the data packets according to the assignment ratios.

26. The computer readable medium of claim 25, wherein the transmission capacity and the assignment ratio of each of the network interfaces are in direct proportion.

27. The computer readable medium of claim 23, wherein each of the network interfaces corresponds to a maximum transmission unit, the detecting step further defines the smallest maximum transmission unit as a minimum transmission unit, and each of the data packets is not larger than the minimum transmission unit.

28. A computer readable medium, storing an application program for executing a method for making a gateway transmit a datum to a mobile device on the Internet through a plurality of base stations, the method comprising the steps of:
receiving the datum from the Internet;
generating a plurality of data packets according to the datum, each of the data packets carrying the same IP address;
requesting a transmission parameter of each of a plurality of network interfaces of the mobile device, wherein each of the network interfaces corresponds to one of the base stations, and each of the transmission parameters indicates a transmission status of the corresponding network interface;
calculating a transmission capacity of the corresponding network interface according to the transmission parameter;
assigning the data packets to the network interfaces according to the transmission capacities;
adding a tunnel header to each of the data packets to derive a tunnel data packet according to the assignment, wherein the tunnel header indicates the assigned network interface; and
transmitting each of the tunnel data packets to the corresponding base station according to the tunnel header.

29. The computer readable medium of claim 28, wherein the calculating step calculates the transmission capacity according to the following equation:

$$C = B \log_2(1+SNR);$$

wherein C denotes the transmission capacity, B denotes an available bandwidth of the corresponding network interface, and SNR denotes the signal-to-noise ratio of a transmission channel of the corresponding network interface.

30. The computer readable medium of claim 28, the method further comprising the steps of:
querying each of the base stations to know if the network interfaces are available to the mobile device; and
storing a relationship between the mobile device and the network interfaces.

31. The computer readable medium of claim 28, the method further comprising the step of:
deciding an assignment ratio for each of the network interfaces according to the transmission capacities;
wherein the assigning step assigns the data packets according to the assigning ratios.

32. The computer readable medium of claim 31, wherein the transmission capacity and the assignment ratio of each of the network interfaces are in direct proportion.

33. The computer readable medium of claim 28, each of the network interfaces corresponds to a maximum transmission unit, the method further comprising the step of:
defining the smallest maximum transmission unit as a minimum transmission unit and each of the data packets is not larger than the minimum transmission unit.

* * * * *